US010617995B2

(12) United States Patent
Fournier et al.

(10) Patent No.: US 10,617,995 B2
(45) Date of Patent: Apr. 14, 2020

(54) PROCESS FOR PRODUCING MAGNESIUM METAL BY DEHYDRATING DIHYDRATE MAGNESIUM CHLORIDE

(71) Applicant: ALLIANCE MAGNÉSIUM INC., Brossard (CA)

(72) Inventors: Joël Fournier, Carignan (CA); Laury Gauthier, St-Apollinaire (CA)

(73) Assignee: ALLIANCE MAGNÉSIUM, Brossard, QC ( * ) Notice: Subject to any disclaimer, the term of this patent is extended or adjusted under 35 U.S.C. 154(b) by 276 days.

(21) Appl. No.: 15/533,785

(22) PCT Filed: Dec. 10, 2015

(86) PCT No.: PCT/CA2015/051302
§ 371 (c)(1),
(2) Date: Jun. 7, 2017

(87) PCT Pub. No.: WO2016/090489
PCT Pub. Date: Jun. 16, 2016

(65) Prior Publication Data
US 2017/0368500 A1    Dec. 28, 2017

Related U.S. Application Data

(60) Provisional application No. 62/089,884, filed on Dec. 10, 2014.

(51) Int. Cl.
*B01D 53/26* (2006.01)
*C25C 3/04* (2006.01)
(Continued)

(52) U.S. Cl.
CPC ......... *B01D 53/261* (2013.01); *B01D 5/0015* (2013.01); *B01D 53/1456* (2013.01);
(Continued)

(58) Field of Classification Search
CPC ........... C22B 26/22; C22B 7/007; C25C 3/04; B01D 53/261; B01D 5/0015; B01D 53/68;
(Continued)

(56) References Cited

U.S. PATENT DOCUMENTS 1,800,589 A * 4/1931 Barstow .................... C25C 3/04
205/404
3,779,870 A * 12/1973 Gudmundsen ........ C01B 7/0712
203/12
(Continued)

FOREIGN PATENT DOCUMENTS

| CN | 1412114 | 4/2003 |
|---|---|---|
| CN | 1613770 | 5/2005 |

(Continued)

OTHER PUBLICATIONS

Adham, K. et al. "Fluid Bed Dehydration of Magnesium Chloride." Magnesium Technology 2012. pp. 49-53. (Year: 2012).*

*Primary Examiner* — Tima M. McGuthry-Banks
(74) *Attorney, Agent, or Firm* — Norton Rose Fulbright

(57) ABSTRACT

The present description relates to a process for producing magnesium metal from dihydrate magnesium chloride comprising the steps of dehydrating $MgCl_2 \cdot 2H_2O$ with anhydrous hydrochloric acid (HCl) to obtain anhydrous magnesium chloride in an inert environment, releasing the mixture of hydrous HCl and protection gas; and electrolyzing the anhydrous magnesium chloride in an electrolytic cell fed with hydrogen gas under free oxygen atmosphere content, wherein magnesium metal and anhydrous hydrogen chloride are produced, wherein a part of the hydrous HCl is passed through a scrubbing unit to obtain a hydrochloric acid solution, the other part of the hydrochloric chloride gas is dehydrated by contact with a desiccant agent in a drying unit to produce anhydrous HCl, and wherein the anhydrous HCl (Continued)

produced by at least one of the electrolytic cell and the drying unit is reused to dehydrate the of MgCl$_2$.2H$_2$O.

18 Claims, 2 Drawing Sheets

(51) Int. Cl.

| | | |
|---|---|---|
| *C22B 26/22* | (2006.01) | |
| *B01D 53/14* | (2006.01) | |
| *B01D 53/68* | (2006.01) | |
| *C25C 7/06* | (2006.01) | |
| *C22B 7/00* | (2006.01) | |
| *C01B 7/03* | (2006.01) | |
| *C01B 7/07* | (2006.01) | |
| *B01D 5/00* | (2006.01) | |

(52) U.S. Cl.
CPC ............ *B01D 53/26* (2013.01); *B01D 53/68* (2013.01); *C01B 7/035* (2013.01); *C01B 7/0712* (2013.01); *C22B 7/007* (2013.01); *C22B 26/22* (2013.01); *C25C 3/04* (2013.01); *C25C 7/06* (2013.01); *B01D 2252/103* (2013.01); *B01D 2256/26* (2013.01); *B01D 2257/2045* (2013.01); *B01D 2257/80* (2013.01)

(58) Field of Classification Search
CPC ......... B01D 53/685; C01B 7/01; C01B 7/035; C01B 7/0712
See application file for complete search history.

(56) References Cited

U.S. PATENT DOCUMENTS 4,518,475 A * 5/1985 Sivilotti .................. C25C 7/005
204/247
4,563,339 A    1/1986 Subramanian et al.

FOREIGN PATENT DOCUMENTS

| CN | 1736872 | 2/2006 |
|---|---|---|
| CN | 101734693 | 6/2010 |
| CN | 102275960 | 12/2011 |
| GB | 610806 | 10/1948 |
| WO | 2014/029031 | 2/2014 |
| WO | 2014029031 | 2/2014 |
| WO | 2016/008056 | 1/2016 |

* cited by examiner

PROCESS FOR PRODUCING MAGNESIUM METAL BY DEHYDRATING DIHYDRATE MAGNESIUM CHLORIDE

TECHNICAL FIELD

The present description relates to a process for producing magnesium metal from dihydrate magnesium chloride wherein anhydrous HCl is released and recycled.

BACKGROUND ART

Magnesium can be produced commercially by electrolysis of anhydrous magnesium chloride melts. It is well known that the drying process is the most complex and difficult stage in the electrolysis process in the production of magnesium. In fact, most of the R&D in magnesium production over the last decades focused on the drying process for production of anhydrous magnesium chloride with low content of magnesium oxide. The reason for this is to avoid three negative characteristics of the magnesium chloride hydrate hydrolysis reaction:
1. The creation of magnesium oxide, which will cause sludging in the electrolysis cells, which reacts with the graphite anodes and negatively impacts the energy efficiency of the electrolytic cell.
2. Losses of magnesium chloride during the process.
3. Some oxycompounds can participate in parasitic electrochemical reactions on the carbon anode consuming it in the process.

Therefore, complete dehydration of $MgCl_2$ must be conducted under conditions which minimize magnesium oxidation. Temperature and gaseous environment influence the formation of magnesium oxide compounds. To avoid that magnesium comes into contact with the air and so minimize the risk of oxidation, electrolysis cells operate under an inert atmosphere.

The dehydration of magnesium chloride hexahydrate is commonly carried out in a one or two stages drying process with hot air followed by one-stage of HCl drying. The first allow to remove between four and five hydrate content. Final dehydration of the $MgCl_2.2H_2O$ must take place with large amount of dry HCl gas to prevent hydroxychloride formation (MgOHCl). This gas has to be dehydrated before recirculation.

By conventional electrolysis processes of magnesium metal production, dichlore gas ($Cl_2$) is released then combined with hydrogen gas ($H_2$) to form hydrogen chloride gas (HCl), which is used for drying magnesium chloride as indicated above. Presently, magnesium chloride feed preparation involves important costs, decreasing profits margins due mainly to the energy consumption to heat the gas at elevated temperature.

U.S. Pat. No. 3,760,050 describes a process for the preparation of substantially anhydrous magnesium chloride suitable for fusion electrolysis. The authors have put emphasis on size, mechanical strength and resistance to abrasion of magnesium chloride pellets. Accordingly, the manufacture of pellets involves balling together dehydrate prills and tetrahydrate molten in a rotating disk. The agglomerates are thereafter dehydrated in a shaft kiln by HCl gas at 330° C. for about 900 minutes. The disadvantage of this treatment is that it consumes a lot of energy to reach this temperature and maintain the heat condition for a long time. Furthermore, U.S. Pat. No. 3,760,050 does not disclose a mean to dehydrate hydrous HCl gas released in the described process for recycling in a continuous process of magnesium metal production.

Accordingly, there is thus still a need to be provided with a cost-effective process for producing magnesium metal from $MgCl_2.2H_2O$ and recycling the HCl used during the dehydration process under an inert environment.

SUMMARY

In accordance with the present description there is now provided a process for producing magnesium metal from dihydrate magnesium chloride comprising the steps of dehydrating $MgCl_2.2H_2O$ with anhydrous hydrochloric acid (HCl) to obtain anhydrous magnesium chloride, releasing hydrous HCl gas; and electrolyzing the anhydrous magnesium chloride in an electrolytic cell fed using an inert gas under an inert atmosphere, wherein magnesium metal and hot anhydrous hydrogen chloride are produced, wherein a first fraction of the hydrous HCl gas is dehydrated by contact with a desiccant agent in a drying unit to produce anhydrous HCl and water, and wherein said hot anhydrous HCl produced by at least one of the electrolytic cell and the drying unit is reused to dehydrate the $MgCl_2.2H_2O$.

In an embodiment, the process described herein further comprises the step of feeding a second fraction of the hydrous HCl gas through a scrubbing unit to obtain a hydrochloric acid solution.

In an embodiment, the hydrochloric acid solution contains 30-34% of HCl.

In another embodiment, the hydrochloric acid solution is continuously cooled by heat exchanger.

In an embodiment, the hydrochloric acid solution is at a temperature between −10 to 0° C.

In another embodiment, the process described herein further comprises the step of feeding the first fraction of the hydrous HCl gas into a condenser for desiccation to produce hydrogen chloride gas and a hydrochloric acid solution of 22-28% before being dehydrated in the drying unit.

In an embodiment, a dehydrating agent is further fed into the condenser.

In another embodiment, the dehydrating agent is a hydrochloric acid solution.

In another embodiment, the process described herein further comprises the step of feeding the first fraction of the hydrous HCl gas and a dehydrating agent into a condenser for desiccation to produce hydrogen chloride gas and a hydrochloric acid solution of 22-28%, before the hydrogen chloride gas being dehydrated in the drying unit, wherein the dehydrating agent is the hydrochloric acid solution of 30-34% obtained from the scrubbing unit.

In another embodiment, one or more chloride is concurrently fed into the condenser.

In an embodiment, the one or more chloride is a chloride solid.

In another embodiment, the one or more solid chloride is added to the hydrochloric acid solution before being fed into the condenser.

In another embodiment, the one or more chloride is at least one of a hydrochloric solution, a HCl—LiCl solution, a $HCl—CaCl_2$ solution, a $HCl—MgCl_2$ solution and a $HCl—ZnCl_2$ solution.

In another embodiment, the hydrochloric acid solution of 22-28% is recycled to a leaching step of a process of extracting magnesium from magnesium bearing ores producing $MgCl_2.2H_2O$.

In another embodiment, the desiccating agent is at least one of $CaCl_2$, $CaSO_4$, and $H_2SO_4$.

In an embodiment, the condenser is a plate column.

In a further embodiment, the drying unit is a drying tower.

In a supplemental embodiment, the anhydrous HCl is at 400° C.

In another embodiment, the $MgCl_2 \cdot 2H_2O$ is dehydrated in a fluidized bed dryer.

In another embodiment, the anhydrous HCl is reintroduced in the fluidized bed dryer.

BRIEF DESCRIPTION OF THE DRAWINGS

Reference will now be made to the accompanying drawings, showing by way of illustration, a preferred embodiment thereof, and in which.

DETAILED DESCRIPTION

It is provided a process for producing magnesium metal from dihydrate magnesium chloride wherein anhydrous HCl is produced in-situ and recycled back in the process in a free oxygen atmosphere.

The present disclosure concerns the dehydration of dihydrate magnesium chloride in anhydrous magnesium chloride which is used to produce magnesium metal by electrolysis. It is specifically described a process to dehydrate magnesium chloride by the use of anhydrous HCl gas which is dried for recirculation.

Figure 1:
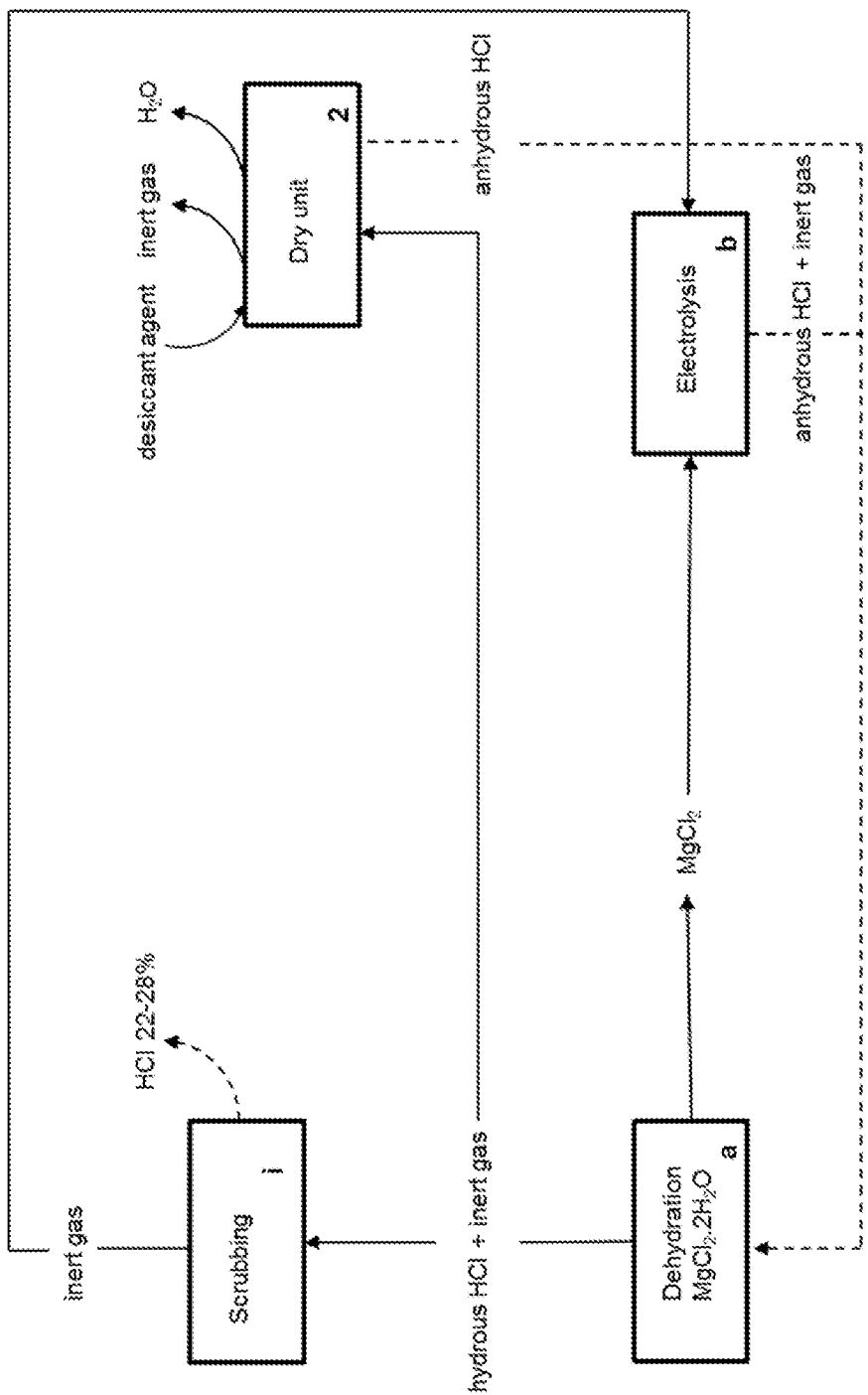
FIG. 1 illustrates a bloc diagram of a process according to one embodiment for producing magnesium metal from dihydrate magnesium chloride and recycling the anhydrous HCl produced.
Figure 2:
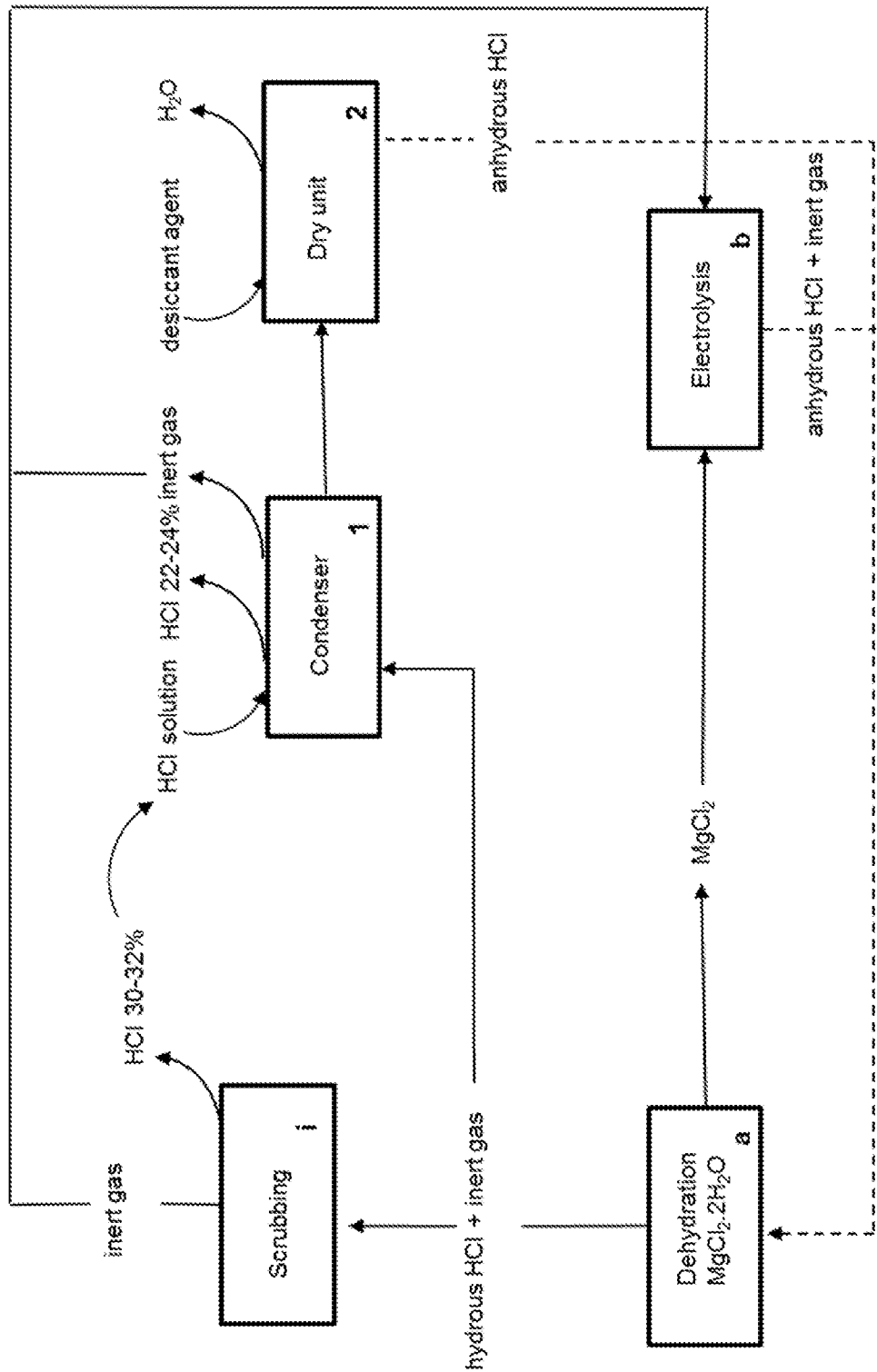
FIG. 2 illustrates a bloc diagram of a process according to another embodiment for producing magnesium metal from dihydrate magnesium chloride and recycling the anhydrous HCl produced.

The process described herein concerns the dehydration of $MgCl_2 \cdot 2H_2O$ by HCl gas from an electrolysis cell and a dehydration unit(s) of hydrous HCl. As can be seen in FIGS. 1 and 2, essentially the dehydration unit(s) encompasses a condenser, a dry unit, and a scrubbing unit under an inert atmosphere.

Dihydrate salt are dried to anhydrous $MgCl_2$ in a fluidized bed with HCl at elevated temperature, approximately 400 to 450° C. (step a in FIG. 1). Under these conditions the chloride is convert to the anhydrous form in a rapid rate than at lower temperatures. For examples, at 300° C., 16.5 hours were necessary to dry magnesium chloride partially hydrated compared to 5 minutes at 400° C.

The hot HCl gas leave the electrolysis cell at 600-700° C. while HCl gas leaving the dehydration units could be at less than 100° C. Depending on the desiccant agent used in the drying unit, the temperature will vary according to operational conditions, which differ on solid or liquid state. The dehydration is conducted under a free oxygen atmosphere by the presence of protection gas from an electrolysis cell. To obtain the targeted temperature, the HCl from the cell passes through a heat exchanger where the thermic energy of the fluid is transferred to the HCl from the dry unit. Alternatively, the hot and cold HCl gases can be mixed to reach the targeted temperature.

It is important to note that as disclosed herein, one advantage of the process described herein is the use of latent heat from the electrochemical cell instead of using a furnace to provide a high temperature (hot) dehydration gas. The heat of the cell is principally generated by the ohmic drop between the anode and cathode transmitting some energy to the molten salt under continuous operation. It is generally admitted in the industry that the cathode connecting bar or busbar should be cooled down to avoid over heating of the cell.

The use of gaseous HCl will fundamentally reduce the hydrolysis reactions, thus reducing magnesium oxide formation. Opposite reactions to hydrolysis take place with HCl. The excess of hot HCl gas prevents or reverses the formation of hydroxychloride and favors the third reaction.

$$MgO + HCl_{(g)} \rightarrow MgOHCl \quad (1)$$

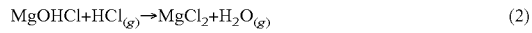

$$MgOHCl + HCl_{(g)} \rightarrow MgCl_2 + H_2O_{(g)} \quad (2)$$

$$MgCl_2 \cdot 2H_2O \rightarrow MgCl_2 + 2H_2O_{(g)} \quad (3)$$

The $MgCl_2$ is then electrolyzed in an electrolysis cell equipped with a diffusion gas anode that generates anhydrous HCl gas. The electrolytic process operate in molten salt media at 700° C. and is maintained in free oxygen content for obvious security reasons. Molten magnesium generated into the cell burns in contact with air and can explode in contact with humid air. The use of a protective gas (inert gas) prevents this reaction. Numerous commercial gases are used to protect this reaction to occur like F134A, HFE7100, HFE7200, Novec-612 or others. The mixture of gas released by the electrolytic cell is used to dehydrate $MgCl_2 \cdot 2H_2O$ together with the HCl gas from the dehydration units.

When a porous carbon anode for distribution of hydrogen is used in an electrolytic production of magnesium, as described for example in PCT/CA 2014/050102, wherein hydrogen gas is fed into the electrolysis cell, the content of which is incorporated herein by reference in its entirety, dry HCl gas is released as per the equation herein below:

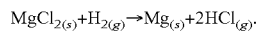

$$MgCl_{2(s)} + H_{2(g)} \rightarrow Mg_{(s)} + 2HCl_{(g)}.$$

As illustrated in FIGS. 1 and 2, the integrated process described herein consists in HCl dehydration, which is recycled back and reintroduced to the base part of the fluidized bed to dehydrate of $MgCl_2 \cdot 2H_2O$. Also, the paired protection gas is returned to the electrolysis step (b). The introduction of protection gas in the circuit limits the level of oxygen thus reducing the magnesium oxide formation.

In an embodiment, as illustrated in FIG. 1, the gas containing water vapor and hydrogen chloride is dehydrated in one step. Typically, a gaseous fraction of the hydrous HCl at 300 to 400° C. passes through a scrubbing unit (step i) to obtain a hydrochloric acid solution at about 22 to 28%. This HCl 22-28% solution can be used for leaching magnesium silicate ores as described for example in the process disclosed in International application no. PCT/CA2015/050670, the content of which is incorporated herein by reference in its entirety.

The other part or fraction of the gaseous hydrous HCl is dehydrated by contact with a desiccant agent in a dry unit (step 2). The desiccating agent can be in a solid or liquid form, such as $CaCl_2$, $CaSO_4$, $H_2SO_4$. These compounds are hygroscopic. Hydrogen chloride gas is dehydrated by chemisorption of water. When the agent is saturated, it is necessary to drive off the water for reusing it by heating. Solid agents are calcined and the temperature required to dry them vary according to the used agent. The sulphuric acid is concentrated by evaporation.

The protection gas is released from the scrubbing unit (step i) and dry unit (step 2). The gas is recycled in the electrolysis step in major part by their low solubility in aqueous media and their non-reactivity with the drying compound.

The dry unit can be for example a drying tower packed with the desiccant agent. When the agent is saturated in water, it is necessary to drive off the water in order to reuse it. The agents in a solid form are dried in an oven or in a fluidized bed to produce granules. The sulphuric acid for example is concentrated by evaporation in an appropriate vessel.

At the end of the process, anhydrous hydrogen chloride at 400-450° C. is produced and reintroduced to the base part of the fluidized bed dryer to dehydrate $MgCl_2.2H_2O$ and a new cycle is restarted.

This way of dehydration allows to obtain a hydrogen chloride gas with low moisture content where the desiccant agent is dried on regular basis according to the mass or volume used.

In another embodiment, two dehydration steps of wet hydrogen chloride are proposed. A fraction of hydrogen chloride at 300 to 400° C. passes first through a scrubbing unit (step i) to obtain a hydrochloric acid solution at about 30 to 34 percent. In contact with water, the HCl is strongly ionized and absorption is favored. The reaction is also exothermic. To reach this level of concentration, the solution is continuously cooled to increase the solubility of the gas.

The concentrated HCl solution and the other part of hydrous hydrogen chloride are fed into a condenser (step 1 in FIG. 2). Hydrochloric solution at 30-34% produced from the scrubbing unit at about −10 to 0° C. can serve as a dehydrating agent. At these temperatures, the vapor pressure of water in a 30-34% HCl solution is low and hydrous HCl gas is efficiently desiccated by contact. Optionally, chloride salts can be added directly to the 30-34% HCl solution in the condenser, which reduces the solubility of HCl gas in aqueous solution and increases the volatility of HCl. For example, one or more chloride used can be at least one of a hydrochloric solution, a HCl—LiCl solution, a HCl—$CaCl_2$ solution, a HCl—$MgCl_2$ solution and a HCl—$ZnCl_2$ solution. A residual hydrochloric acid solution at about 22 to 28% is obtained. This HCl 22-28% solution can be recuperated and used for leaching magnesium silicate ores as described hereinabove.

Particularly, regarding the use of the condenser in step 1, the concentrated HCl solution is fed to the upper part of the condenser and the hydrous HCl gas at bottom part. A plate column can be used as a condenser which is maintained cold by a thermal heat exchanger where a coolant liquid is circulated.

Alternatively, the HCl solution is supplemented to the condenser and not coming from a scrubbing unit in order for the hydrous HCl gas to be efficiently desiccated by contact as described previously.

The HCl gas released from the condenser is then passed through the drying unit (step 2) as described hereinabove, mainly dehydrating the HCl gas by contact with the desiccant agent in the dry unit to produce anhydrous HCl. Anhydrous hydrogen chloride is produced and reintroduced to the base part of the fluidized bed dryer to dehydrate $MgCl_2.2H_2O$ in order for a new cycle to be restarted.

The process described above generates an HCl gas with very low moisture content where the water absorbed by the desiccating agent is dried off less frequently than the previous method described. By limiting the drying process, energy is saved.

While the invention has been described in connection with specific embodiments thereof, it will be understood that it is capable of further modifications and this application is intended to cover any variations, uses, or adaptations of the invention, including such departures from the present disclosure as come within known or customary practice within the art to which the invention pertains and as may be applied to the essential features hereinbefore set forth, and as follows in the scope of the appended claims.

What is claimed is:

1. A process for producing magnesium metal from dihydrate magnesium chloride comprising the steps of:
    (1) dehydrating $MgCl_2.2H_2O$ with anhydrous hydrogen chloride (HCl) to obtain anhydrous magnesium chloride, releasing hydrous HCl gas; and
    (2) electrolyzing the anhydrous magnesium chloride in an electrolytic cell feed using an inert gas under an inert atmosphere, wherein magnesium metal and anhydrous HCl are produced,
wherein a first fraction of the hydrous HCl gas is feed into a condenser for desiccation producing hydrogen chloride gas and a hydrochloric acid solution and the hydrogen chloride gas is dehydrated by contact with a desiccant agent in a drying unit to produce anhydrous HCl and water, a second fraction of the hydrous HCl gas is fed through a scrubbing unit to obtain a hydrochloric acid solution, and wherein said anhydrous HCl produced by at least one of the electrolytic cell and the drying unit is reused to dehydrate the $MgCl_2.2H_2O$.

2. The process of claim 1, wherein the hydrochloric acid solution is a 30-34% v/v hydrochloric acid solution.

3. The process of claim 1, wherein the hydrochloric acid solution is continuously cooled by heat exchanger.

4. The process of claim 3, wherein said hydrochloric acid solution is cooled at a temperature between −10 to 0° C.

5. The process of claim 1, wherein the hydrochloric acid solution is a 22-28% v/v hydrochloric acid solution.

6. The process of claim 1, wherein a dehydrating agent is further fed into the condenser.

7. The process of claim 6, wherein the dehydrating agent is a hydrochloric acid solution.

8. The process of claim 1, wherein one or more chloride is concurrently fed into the condenser.

9. The process of claim 8, wherein the one or more chloride is a chloride solid.

10. The process of claim 9, wherein the one or more solid chloride is added to the hydrochloric acid solution before being fed into the condenser.

11. The process of claim 8, wherein the one or more chloride is at least one of a hydrochloric solution, a HCl—LiCl solution, a HCl—$CaCl_2$ solution, a HCl—$MgCl_2$ solution and a HCl—$ZnCl_2$ solution.

12. The process of claim 8, wherein said condenser is a plate column.

13. The process of claim 1, wherein the hydrochloric acid solution of is recycled to a leaching step of a process of extracting magnesium from magnesium bearing ores producing $MgCl_2.2H_2O$.

14. The process of claim 1, wherein the desiccating agent is at least one of $CaCl_2$, $CaSO_4$, and $H_2SO_4$.

15. The process of claim 1, wherein the drying unit is a drying tower.

16. The process of claim 1 wherein the anhydrous HCl produced by at least one of the electrolytic cell and the drying unit is at 400° C.

17. The process of claim 1, wherein the $MgCl_2.2H_2O$ is dehydrated in a fluidized bed dryer.

18. The process of claim 17, wherein the anhydrous HCl is reintroduced in the fluidized bed dryer.

* * * * *